Feb. 18, 1930.  E. G. SPRUNG  1,747,741
DRAG LINK CONNECTION
Filed Sept. 5, 1924
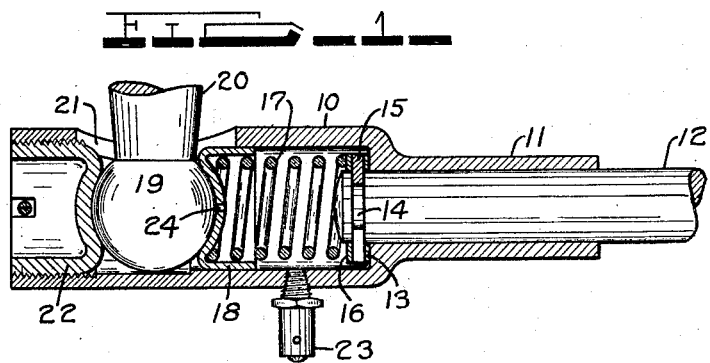
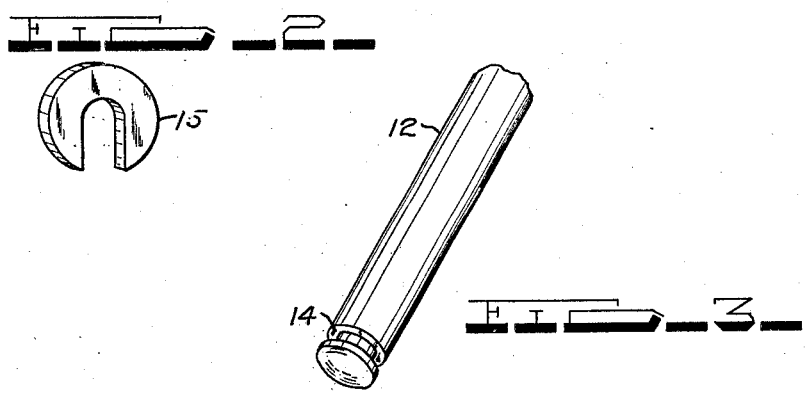
INVENTOR
EDWIN G. SPRUNG
BY
ATTORNEY Patented Feb. 18, 1930

1,747,741

UNITED STATES PATENT OFFICE

EDWIN G. SPRUNG, OF DETROIT, MICHIGAN, ASSIGNOR TO THE STUDEBAKER CORPORATION, OF SOUTH BEND, INDIANA, A CORPORATION OF NEW JERSEY.

DRAG-LINK CONNECTION

Application filed September 5, 1924. Serial No. 736,091.

This invention relates to ball and socket joints, particularly adaptable for use in connection with steering reach rods, drag-links, and other such motor vehicle parts, and the principal object is to provide a joint of this class of novel, new and simple construction, and one that will be economical to manufacture.

Another object is to provide a device of the class described in which the ball socket member is swivably mounted upon its rod to allow the ball member to operate in a much greater range angularly about the axis of the socket member than is possible in the conventional constructions.

Another object is to provide a device of the class described, that will be easy to machine and to assemble or disassemble or to replace worn parts.

A further object is to provide a device of the class described in which the rod or link member is slidably and rotatably received in the socket member and is provided with a circumferential groove adjacent the end received in the socket member, which groove is adapted to receive a U collar which seats in the bottom of the socket member and prevents the link from pulling out, and is held in such position by the pressure of the spring used to hold the ball seats against the ball.

The above being among the objects of the present invention, the same consists in certain features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the several views.

Figure 1 is a sectional view taken longitudinally through the center of one end of a drag-link embodying the present invention.

Figure 2 is a perspective view of the U washer used to hold the rod or link in the socket member.

Figure 3 is a perspective view of the rod or link member.

The drag link shown in the drawing comprises a socket member 10 provided with a reduced neck portion 11 which slidably and rotatably receives the rod or link 12, the opposite end of which, as in the conventional constructions, is suitably connected to some actuating or actuated device not shown in the drawing. The interior of the socket member 10 at the point where its diameter is reduced to form the neck 11 is preferably machined out to form a flat annular seat for the thrust member 13 which surrounds the rod 12 at that point. A circumferential groove 14 is formed in the link 12 adjacent its end and a U collar 15, of slightly less outside diameter than the inside diameter of the socket member 10, is received in the groove 14 and seats against the thrust member 13, the U collar 15 being prevented from disengagement with the groove 14 by the walls of the socket member 10. A second thrust member 16 of the same construction as the thrust member 13 is positioned over the end of the link 12 against the U washer 15 and pressure is exerted thereon by the coil spring 17 which seats thereagainst. The opposite end of the spring 17 seats within the hollow interior of the ball seat 18 which is slidably received in the interior of the socket member 10 and which receives one side of the ball 19 formed on the end of the member 20 which is suitably connected to some actuated or actuating device, not shown, in a conventional manner, and which is introduced into the interior of the socket member 10 through the opening 21 formed in its walls for that purpose. The opposite side of the ball 19 is received by the ball seat 22 which is threaded into the end of the socket member 10 and which puts the spring 17 under compression, thereby resiliently holding the ball 19 between the seats 18 and 22 and the U collar 15, which controls the relative position of the rod 12 in respect to the socket member 10, in its proper position at the bottom of the socket member 10. Suitable means such as the nipple 23 is preferably provided for introducing lubricant into the socket member behind the ball seat 18 and an opening 24 is preferably provided in the ball seat 18 for lubricating the wearing surfaces of the ball 19.

In assembling the joint shown, the link 12 is slipped through the neck 11 until the groove 14 projects past the other end of the socket member 10. The thrust member 13 is then placed over the link 12 and the U collar 15 placed in the groove 14 after which the second thrust member 16 is placed over the end of the link which is then drawn back through the neck 11 until the U collar 15 forces the washer 13 against the bottom of the socket. The spring 17 is then inserted in the socket followed by the seat 18 and the ball 19 is then introduced through the opening 21 after which the seat 22 is threaded home, compressing the spring 17 and thereby resiliently holding all the parts in operative position. Reversal of the operation, which is readily and easily accomplished, disassembles the joint.

It will be apparent that the socket member 10 and link 12 are rotatable relative to each other which thereby allows the use of this joint in places where there is a wide variation angularly between the parts connected, a feature not found in the present conventional constructions. It will also be noticed that with this construction the spring 18 will cushion shocks to which the parts may be subjected. The construction as a whole offers a very economical production construction which at the same time is strong and efficient.

Although the link 12 is shown as being solid, it is evident that a tube may be utilized for the same purpose, and this and other formal changes may be made in the specific embodiment of the invention described without departing from the spirit and substance of the invention, the scope of which is commensurate with the appended claim.

What I claim is:—

A drag link connection comprising a link section of small diameter, a socket section of larger internal diameter than the link section having one end thereof reduced to an internal diameter of approximately the external diameter of the link section and provided with an internal annular flat shoulder, said link section being slidably and rotatably received in said socket section and being provided with a groove adjacent the end received in said socket section, a removable collar engaging said groove, said annular flat shoulder of the link section cooperating with the collar to limit the outward movement of the link relatively to the socket, and resilient means constantly urging said collar toward said shoulder.

Signed by me at Detroit, Michigan, U. S. A., this 2nd day of September, 1924.

EDWIN G. SPRUNG.